Aug. 27, 1963
C. V. STROMBERG
3,101,600
VIBRATION DAMPENERS
Filed Feb. 12, 1962
3 Sheets-Sheet 1
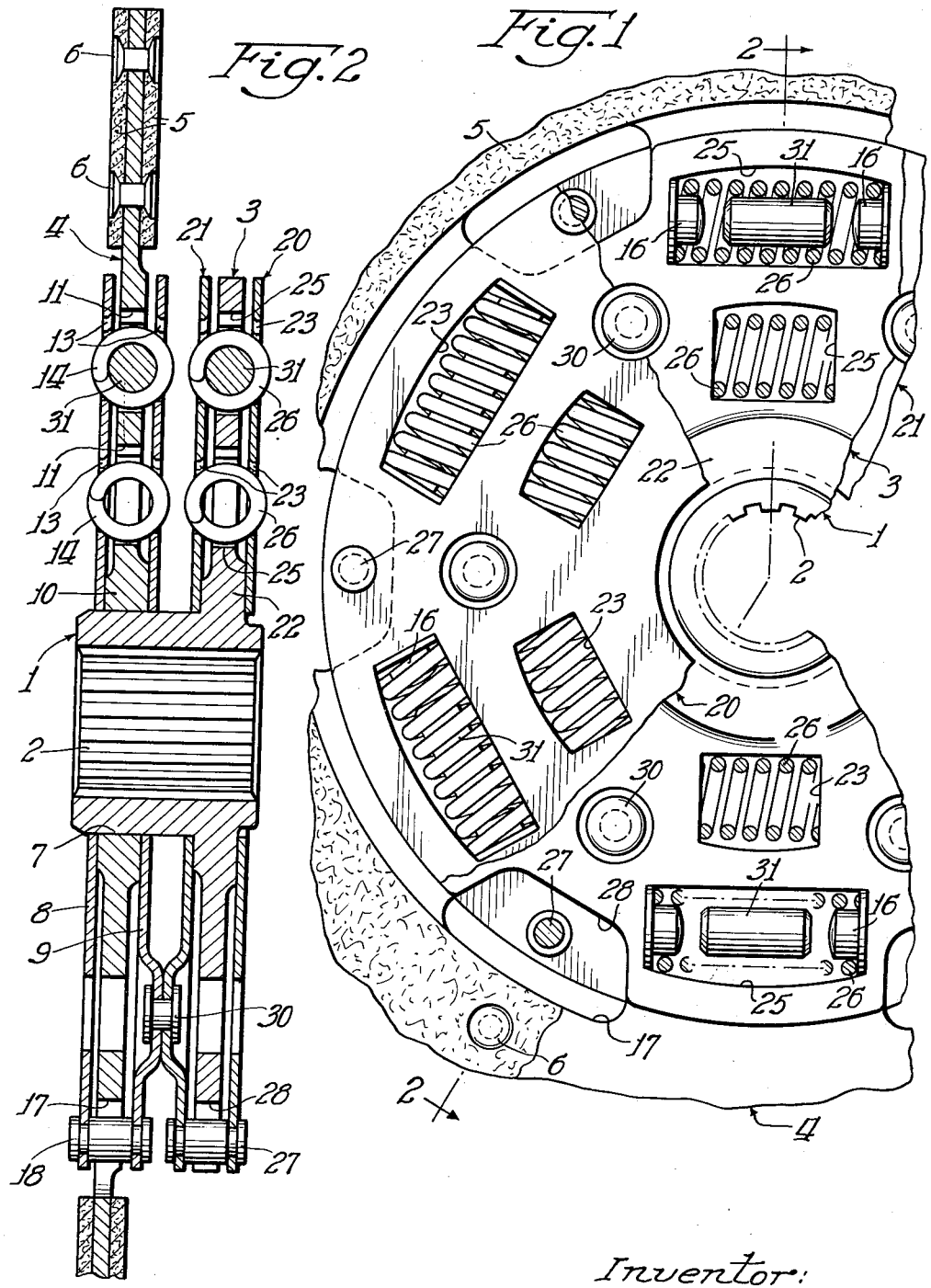
Inventor:
Clinton V. Stromberg
By: John W. Butcher Atty.

Aug. 27, 1963
C. V. STROMBERG
3,101,600
VIBRATION DAMPENERS
Filed Feb. 12, 1962
3 Sheets-Sheet 2
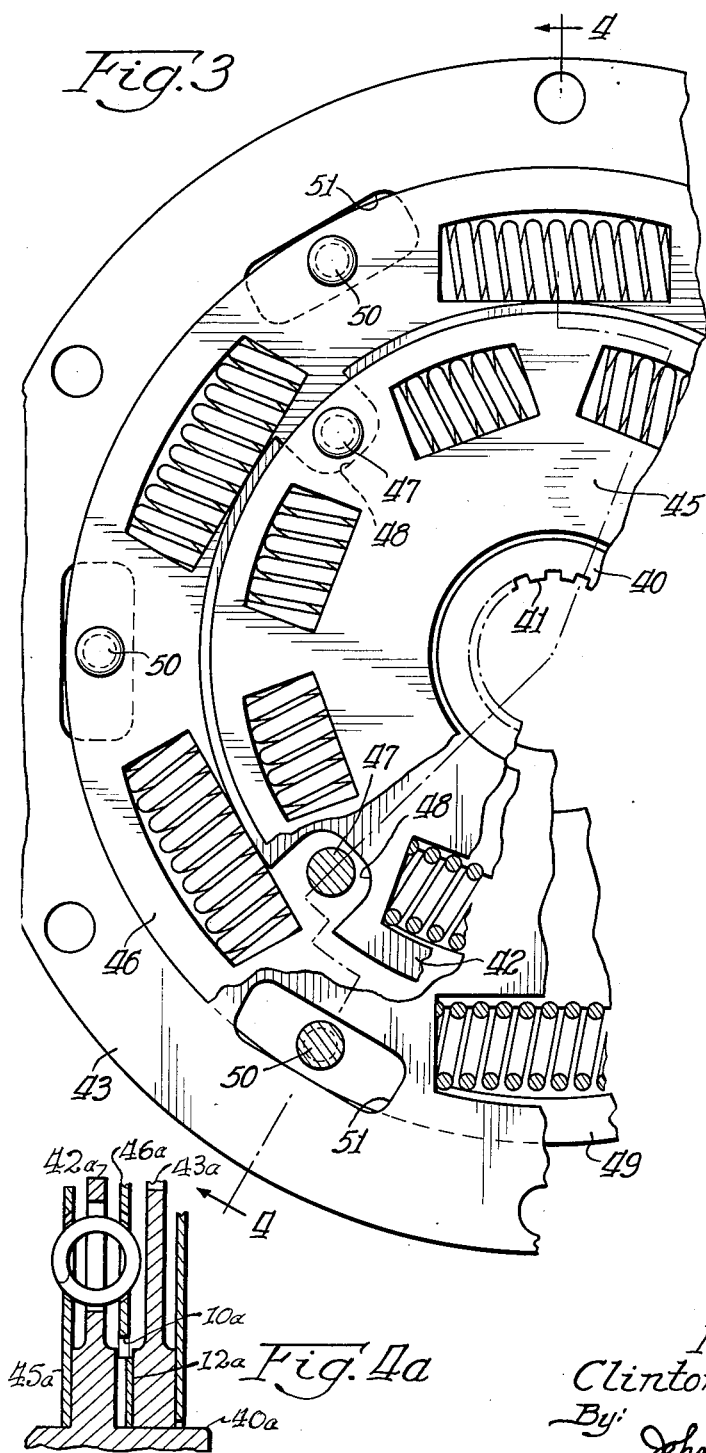
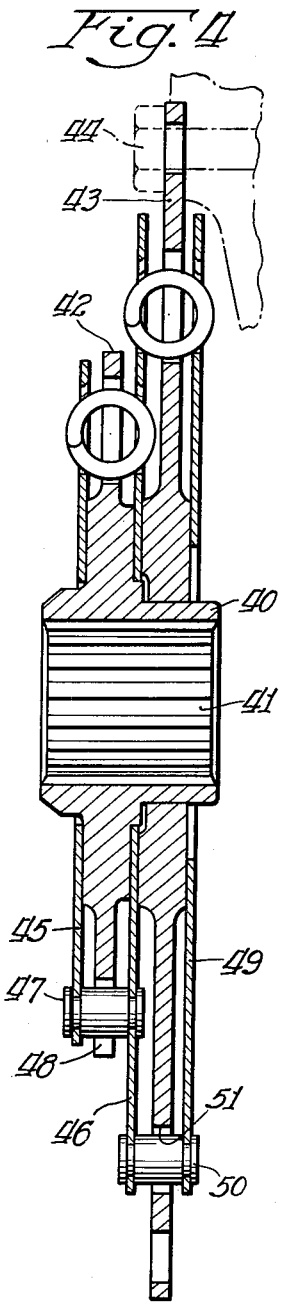
Inventor:
Clinton V. Stromberg
By: John W. Butcher Atty Aug. 27, 1963 C. V. STROMBERG 3,101,600
VIBRATION DAMPENERS
Filed Feb. 12, 1962 3 Sheets-Sheet 3

Inventor:
Clinton V. Stromberg
By John W. Butcher Atty.

3,101,600
VIBRATION DAMPENERS
Clinton V. Stromberg, Allen Park, Mich., assignor to Borg-Warner Corporation, Chicago, Ill., a corporation of Illinois
Filed Feb. 12, 1962, Ser. No. 172,547
7 Claims. (Cl. 64—27)

This invention relates to structures for transmitting a rotary power drive operable to dampen vibrations, and are particularly suited for incorporation in the driven plate member in a heavy-duty vehicle clutch.

Clutch mechanisms incorporating vibration dampening means have been used for many years in automotive vehicles, and are frequently of the general type illustrated in United States Patent No. 2,920,733 to Daniel W. Lysett, issued January 12, 1960. Clutch vibration damper assemblies of the type illustrated in the Lysett patent provide a resilient connection between a clutch plate a driven hub which comprises a plurality of springs respectively disposed between a flange on the hub and a subcombination comprising the clutch plate and a disc washer fixedly connected to said clutch plate. In such constructions, each of the members of the subcombination and the flange on the driving hub are provided with a plurality of substantially rectangular apertures which are coaligned so that a single spring can be received and held within said coaligned apertures respectively in the clutch disc, the driving flange and the disc washer. Thus, torque transmitted from the engine drive shaft, for example, to the clutch plate and the disc member is transmitted through the spring assembly to the flange of the hub. Such damper assemblies are ordinarily designed to carry a torque of approximately 325 pound feet with a maximum amplitude of angular deflection of approximately 9 degrees in either direction.

In the last few years, the market for vibration dampeners in all types of power transmission systems has grown considerably. In the heavy-duty field where diesel engines are used almost universally, it has been found that the usual design of damper does not perform satisfactorily because of insufficient permissible angular deflection. Since there is a practical limit on the length of the spring units provided in the coaligned apertures of a dampener assembly, the maximum limit of amplitude is relatively small. The present invention provides, instead of a single set of springs for transmitting torque from the disc washer to the annular flange of the hub, a plurality of springs sets with an intermediate torque transmitting member. By combining two or more single dampeners in an arrangement whereby the power passes through them in series, it is possible to almost double the angular deflection and thereby obtain quite satisfactory performance in such heavy-duty installations as tractors, trucks, and other diesel powered equipment.

It is therefore one object of the present invention to provide a new and improved clutch device with vibration dampener structure which will dampen effectively the torsional vibration in the drive line of present day, heavy-duty vehicles.

Another object of the present invention is the provision of a device, in accordance with the preceding object, in which torque is transmitted from a driven disc plate through a first set of resilient means to an intermediate driven member, and from said intermediate member through another set of resilient means to the flange on said drive hub.

Another object of the present invention is the provision of a device, in accordance with the preceding objects, which incorporates an improved limit stop means.

Other objects and features of the invention will be readily apparent to those skilled in the art from the specification and appended drawings illustrating certain preferred embodiments in which:

FIGURE 1 is a partial side elevational view with portions broken away to facilitate the showing of a vibration damper assembly incorporating the principles of the present invention;

FIGURE 2 is a sectional view along the plane of line 2—2 of FIGURE 1.

FIGURE 3 is a partial side elevational view with portions broken away, of another embodiment of the present invention;

FIGURE 4 is a sectional view along the plane of line 4—4 of FIGURE 3.

FIGURE 4a is a partial view of an alternate arrangement of the embodiment illustrated in FIGURES 3 and 4.

Figure 6:
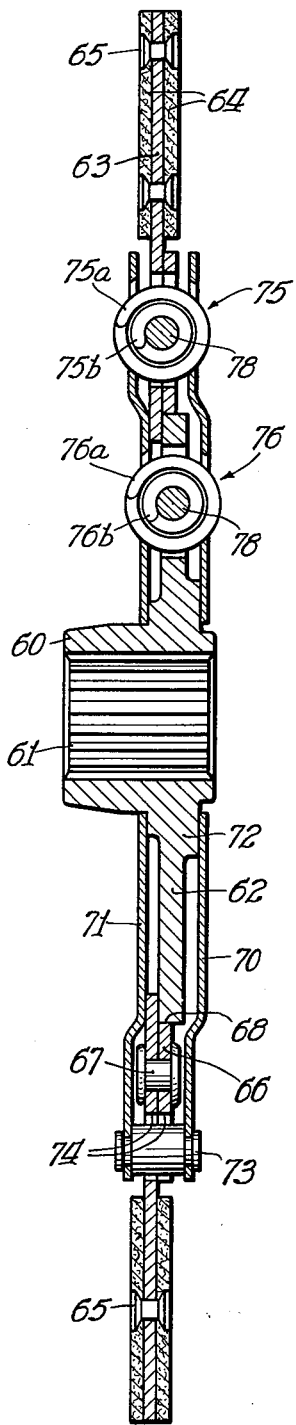
FIGURE 6 is a sectional view along the plane of line 6—6 of FIGURE 5.

Referring first to FIGURES 1 and 2, the vibration damper assembly, as shown herein, comprises an inner hub 1 having a central splined opening 2 extending therethrough and carrying an integral, annular, radially extending flange 3. The damper assembly further comprises a driven annular disc 4 which in the present example constitutes a clutch plate having friction facings 5 secured to the peripheral portion of said annular disc by rivets 6, or in any well-known manner. This latter portion is adapted to be packed between driving members (not shown) in a manner familiar to those skilled in the art. The annular disc 4 has a central bore 7 therethrough which is rotatably seated on the shoulder portion of the hub 1. The annular disc is provided with a thickened, radially innermost portion 10 having flat machined faces on opposite sides thereof and a plurality of substantially rectangular apertures 11 arranged in two concentric circular rows. A pair of washers 8 and 9 are positioned on both sides of the annular disc 4 and in frictional engagement with the thickened portion 10 of said annular disc 4. The washers 8 and 9 are each provided with two concentric, circular rows of substantially rectangular apertures 13 so that the unit is assembled with the respective apertures of washer 8, disc 4, and washer 9 in registered or coaligned relationship, thus providing a unitary opening for the insertion of resilient means. These resilient means may be in the form of springs 14 which are adapted to engage spring seats 16 fixed to the annular disc 4 and which are also in engagement with both the annular disc and the washers 8 and 9 to restrain relative rotation therebetween. The annular disc 4 is further provided with a circular row of apertures 17 through which extend a plurality of shoulder rivets 18 to connect the washers 8 and 9 together in a fixed, spaced relationship for common movement.

It can be seen that torque transmitted to the annular disc friction facings 5 is transmitted to the pair of washers 8 and 9 through spring means 14 in a manner familiar with those skilled in the art and particularly in a manner described in the Lysett patent. It is to be understood that the two circular rows of springs could be replaced by a single circular row of springs which would perform the same function in substantially the same manner. However, by providing two rows of springs it is possible to obtain a considerable degree of flexibility in controlling the torsional dampening characteristics of such unit. By placing these two sets of spring means it is possible to employ a first set of high spring rate springs in one such set and a set of low spring rate springs in the other said set.

A second pair of washers 20 and 21 are positioned on both sides of the annular hub flange 3, being in frictional engagement with the thickened, radially innermost portion 22 of the hub flange 3 in a manner similar to that described with respect to the first pair of washers 8 and 9. These washers are similarly provided with apertures 23 to register with apertures 25 in the hub flange to accommodate spring means 26. This second pair of washers 20 and 21 are connected by plurality of shoulder rivets 27 in fixed, spaced relation through a plurality of cut-out portions 28 on the edge of the hub flange. The adjacent washers of each set, namely washer 9 and washer 21, are connected together for common movement by a plurality of rivets 30, or in any other well-known manner, so that all the washers move together as one unit.

The operation of the aforedescribed vibration damper structure is readily apparent. Vibrations communicated to the annular disc 4, as for example by an internal combustion engine, may cause relative movement between the annular disc 4 and the first pair of washers 9 and 10. These vibrations are transmitted through the spring means 14 between the disc and the first pair of annular washers which eliminate the undesirable vibrations. Since the first pair of washers 9 and 10 is fixedly connected to the second pair of washers 20 and 21, torque is transmitted from the first pair directly to said second pair of washers. Torque is then transmitted from said second pair of washers through the second set of spring means 26 engaging both the second pair of washers and the annular flange 3 of the hub 1 thus dampening out undesirable vibrations transmitted along the line. The angular deflection permitted by this arrangement is substantially twice the angular deflection in the conventional clutch plate assemblies of the prior art. Since the permissible deflection in such prior assemblies is so limited by the allowable compression force on the springs and the axial length of the supporting apertures, this invention provides a unique solution to the requirements of greater angular amplitude and thus provides an effective clutch plate assembly for use in heavy-duty equipment.

The limit stop means which is another important feature of the present invention comprises the spring seats 16 (FIGURE 1) which may be treated to produce additional wear characteristics, and a loose cylindrical slug 31 loosely fitted within said spring means, which cooperate to limit the angular or rotative movement when the washers are deflected relative to the hub or annular disc by action of the slug abutting against the spring seats. These end pieces are hard and tend to reduce the wear which frequently occurs if the spring is allowed to abut directly against the end of the slots on the side plates or washers.

Referring now to FIGURES 3 and 4, this embodiment of the invention is substantially similar in principle. This embodiment also includes a hub 40 having an internally splined opening 41 extending therethrough and carrying an annular flange 42. An annular disc 43 adapted to be connected to a rotatable drive member (not shown) by bolts 44 is positioned on the shoulder portion of the hub 41. As seen in FIGURE 3, the annular disc 43 has a substantially larger outer diameter than the annular flange 42 of the hub 41. A first annular washer 45, having substantially the same outer diameter as said annular flange, is provided on one side of said flange and is in frictional engagement with the radially innermost portion of said flange. On the other side of the annular flange is a washer 46 having a substantially larger outer diameter and the washer is in frictional engagement with the other face of the thickened innermost portion of the flange. The washers 45 and 46 are connected together in a fixed, spaced relationship by a plurality of shoulder rivets 47 extending through cut-out portions 48 on the edge of the flange 42. A third annular washer 49 is provided on the other side of the annular disc member 43 and is in frictional engagement with the thickened, radially innermost portion of said annular disc. Thus, it can be seen that washer 46 is common to both the annular disc 43 and the flange 42. The second washer 46 and the third washer 49 are connected together in fixed, spaced relationship by a plurality of shoulder rivets 50 extending through apertures 51 in the annular disc 43.

The cut-out portions 48 and the apertures 51 cooperate with the shoulder rivets 47 and 50 respectively to limit the relative movement of the disc, the washers and the flange. It is understood, however, that the loose cylindrical slug shown in FIGURES 1 and 2 may be adapted for use with this embodiment.

Frictional damping between the relatively rotatable members, i.e. the annular disc 43 and the annular flange 42, may be controlled by the relative thickness of the thickened hub portions of the annular disc and the annular flange in combination with the length of the shoulder rivets 47 and 50 respectively. In either case, however, the common washer 46 will be caused to press against the hub portion of the annular flange 42 and away from the hub portion of the annular disc 43 as a result of the relative radii (from the axis of the hub 40) of the shoulder rivets 47 and 50 which set up a force couple acting to distort the common washer 46. The embodiment illustrated in FIGURE 4a provides an alternate arrangement wherein the hub 40a is provided with an internally splined opening extending therethrough and with annular flange 42a similar to the structure illustrated in FIGURE 4. An annular disc 43a, adapted to be connected to a rotatable drive member (not shown), is positioned on the shoulder portion of the hub 40a. A first annular washer 45a having substantially the same outer diameter as the annular flange 42a, is provided on one side of the flange and is in frictional engagement with the radially innermost portion of the flange 42a. An annular washer 46a having a substantially larger outer diameter than the first annular washer 45a is provided with a central opening 10a which is larger than the radially innermost portion of the flange 42a. A friction developing means, such as, for example, a wavy spring washer 12a or a washer of friction developing material, is interposed between the radially innermost portion of the flange 42a and the radially innermost portion of the annular disc 43a. This enables the annular washer 46a to act as a load transfer member between the two sets of shoulder rivets (illustrated as shoulder rivets 47 and shoulder rivets 50 in FIGURE 4). Thus, the annular washer 46a may flex due to the force couple set up in the intermediate washer 46a without influencing the frictional damping between the annular disc 43 and the annular flange 42. The intermediate washer 46a and the friction developing means 10a will reduce the over-all rate of flexibility with regard to axial forces. A friction developing material is preferred to a wavy spring washer or the friction developing means in that the friction developing material gives a wider choice of values of damping friction.

Figure 5:
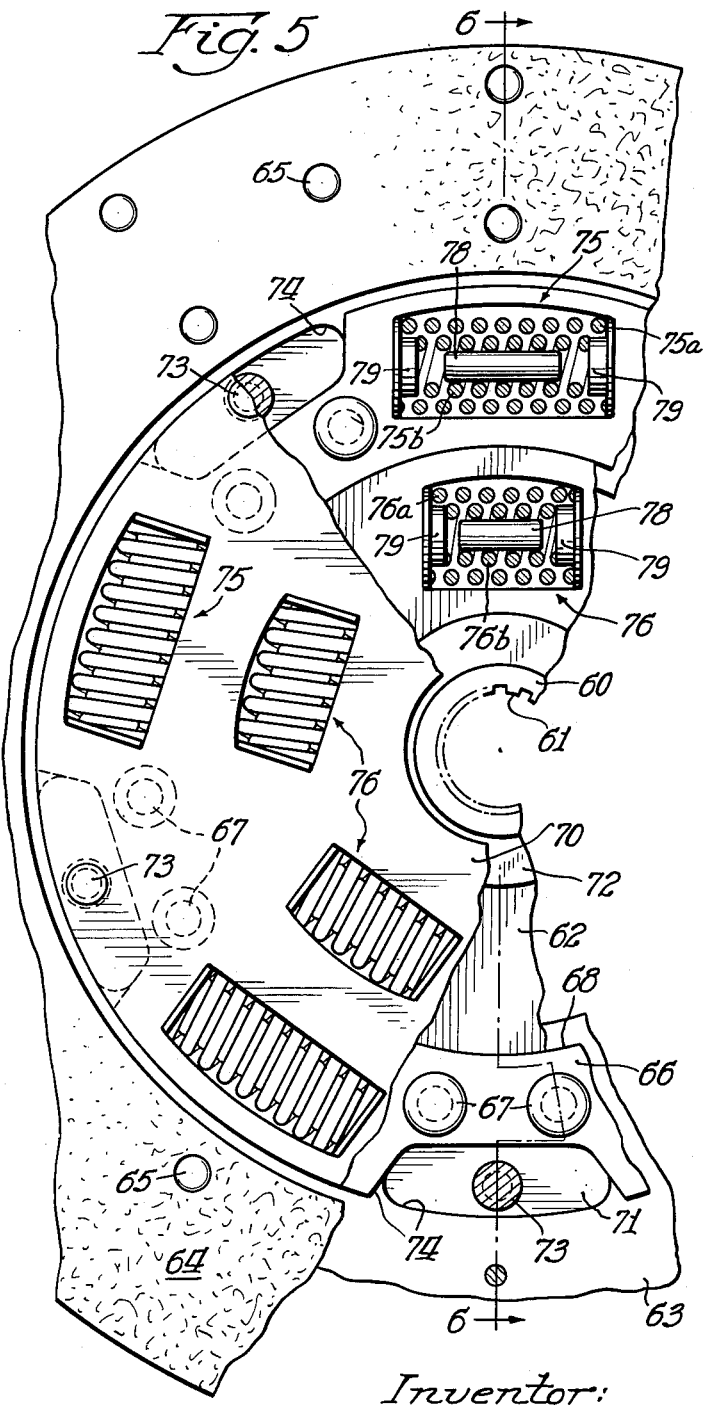
FIGURE 5 is a partial side elevational view with portions broken away, of still another embodiment of a vibration damper assembly incorporating the principles of the present invention.

Referring now to FIGURES 5 and 6, there is illustrated still another embodiment of the present invention, which may be generally described as a concentric design and which has the advantage of being adapted to be installed in drive assemblies where axial space is rather limited. As shown in FIGURES 5 and 6, the assembly comprises a hub 60 having an internally splined opening 61 extending therethrough and an annular, radially extending flange 62. An annular disc member 63 is provided with friction facings 64 secured to the peripheral area of the same by a plurality of rivets 65 in the known manner. The annular disc member 63 is provided with an annular ring member 66 on one face thereof adjacent its radially innermost portion and connected to the same by a plurality of rivets 67. This forms an annular recessed portion 68 which is adapted to accommodate and seat the outer edges of the flange 62 on one side thereof as best shown in FIGURE 6. Thus, the disc member 63 is supported by the outer edges of the flange 62 and is adapted to rotate relative thereto. On both sides of the annular flange are washers 70 and 71 which are in frictional engagement with the faces of the radially innermost thickened portion 72 of the hub. It will be noted the radially outermost portions of the washers 70 and 71 are offset axially with respect to the radially innermost portions of said washers. This is to accommodate the disc member 63 which is similarly offset axially with respect to the flange. The washers 70 and 71 are connected together in fixed, spaced relationship by a plurality of shoulder rivets 73 extending through cut-out portions 74 on the edges of the disc member 63 and the annular ring member 66. A first circular row of springs 75 is positioned in coaligned or registered apertures through the washers 70 and 71 and the disc member 63 in the same manner described above in regard to the other modifications.

Torque is thus transmitted from the disc member through the first set of springs means to the outer edges of the annular washers 70 and 71. A second circular row of springs 76 is positioned in apertures provided in the washers and in the annular flange 62. This set of springs transmits torque from the washers through the second set of spring means to the flange 62.

Each set of spring means 75, 76 comprises a first spring 75a, 76a of relatively large diameter and a second spring 75b, 76b of lesser diameter nested within said first spring. With this arrangement extremely flexible dampening characteristics can be obtained by simply substituting springs having different spring rates.

A limit stop slug 78 of the type described in the embodiment shown in FIGURES 1 and 2 is similarly provided in the embodiment of FIGURES 5 and 6. Accordingly, there is provided a pair of spring seats 79 for each aperture and limit stop slugs positioned within the spring means limit the angular travel of the washers with respect to the disc means and the annular flange.

It will be seen that the aforedescribed vibration dampers are readily assembled and that a wide variation of damper characteristics can be obtained by using springs having different spring rates. With these devices, the springs which are employed in the unit may be of sufficiently high spring rate to be effectively employed in heavy-duty equipment such as diesel engines installation. Furthermore, the dampening characteristics are most effectively increased by the greater amplitude of angular deflection between the driven disc member and the central driven hub. Amplitudes as great as 18° have been achieved with the present invention with superior dampening results.

While certain preferred embodiments of the invention have been specifically disclosed, it is understood that the invention is not limited thereto, as many variations will be readily apparent to those skilled in the art and the invention is to be given its broadest possible interpretation within the scope of the following claims.

What is claimed is:

1. A vibration damper assembly comprising a hub having a radially extending annular flange, a first annular member, a plurality of apertures formed in said annular flange and in said annular member coaligned with respect to each other forming a first set of apertures, spring means positioned within said first set of apertures adapted to transmit torque from said first annular member to said flange, a second annular member, a plurality of apertures formed in said second annular member and in said first annular member coaligned with respect to each other forming a second set of apertures and a second spring means positioned within said second set of apertures adapted to transmit torque from said second annular member to said first annular member.

2. A clutch plate assembly comprising a hub having an annular flange with faces on opposite sides thereof, a first pair of annular washers in frictional engagement with a portion of each face of said annular flange, means connecting said pair of washers for common movement, an annular disc member carried on and surrounding said hub having faces on opposite sides thereof, said disc member having friction facings thereon, a second pair of washers in frictional engagement with a portion of each face of said disc member, means for connecting said second pair of washers for common movement, means for connecting said first pair and said second pair of annular washers for common movement, a first set of spring means engaging said disc member and said second pair of washers adapted to transmit torque from said disc member to said second pair of washers, and a second set of spring means in engagement with said first pair of washers and said annular flange adapted to transmit torque from said first pair of washers to said annular flange.

3. A clutch plate assembly comprising a hub having an integral annular flange, said flange having a thickened innermost radial portion, a first pair of annular washers in engagement with opposite sides of said thickened portion of said radial flange, means connecting said pair of washers for common movement, an annular disc member surrounding said hub and rotatable with respect to said hub having a thickened innermost radial portion, a second pair of washers in engagement with opposite sides of said disc member at said thickened portion, means connecting said second pair of washers for common movement, means for connecting said first pair and said second pair of annular washers for common movement, a first set of spring means engaging said annular disc member and said second pair of washers adapted to transmit torque from said disc member to said second pair of washers, and a second set of spring means in engagement with said first pair of washers and said annular flange adapted to transmit torque from said first pair of washers to said annular flange.

4. A clutch plate assembly comprising a hub having an annular flange having a first face and a second face, an annular disc member having a first face and a second face carried on said hub for relative rotational movement therewith, a first annular washer engaging said first face of said annular disc member, a second washer having an outer diameter substantially the same as said first washer engaging said second face of said disc member and engaging said first face of said annular flange, a third annular washer engaging said second face of said annular flange having an outer diameter less than the diameter of said first and second washer, means for connecting said first washer, said second washer, and said third washer together for common movement, first spring means engaging said disc and said first washer and second washer, second spring means engaging said annular flange, said second washer and said third washer, whereby torque is transmitted in series from said disc member through said first spring means to said second washer and from said second washer through said second spring means to said annular flange.

5. A clutch plate assembly comprising a hub having an annular flange having a first face and a second face, an annular disc member having a first face and a second face carried on said hub for relative rotational movement therewith, a first annular washer engaging said first face of said annular disc member, a second annular washer having an outer diameter substantially the same as said first annular washer engaging said second face of said disc member and also said first face of said annular flange, a third annular washer engaging second face of said annular flange having an outer diameter less than the diameter of said first washer and second washer, means for connecting said first washer and second washer together for common movement with respect to each other, means for connecting said second washer and said third washer together for common movement with respect to each other, first spring means engaging said disc and said first washer and second washer, second spring means engaging said annular flange and said second washer and third washer, whereby torque is transmitted in series from said disc member through said first spring means to said second annular washer and from said second annular washer through said second spring means to said annular flange.

6. A clutch plate assembly comprising a hub having an annular flange having opposed faces, an annular disc having a recessed annular portion on its inner circumferential edge providing a seat, the outermost radial portion of said flange adapted to fit within said seat for relative rotational movement therewith, a pair of annular washers surrounding said hub having radially innermost portions in frictional engagement with both faces of said flange and having radially outermost portions slightly axially offset from said radially innermost portions of said annular washers, means for connecting said pair of washers together for common rotational movement, a first set of spring means engaging said annular disc and the outermost offset portion of said pair of washers, a second set of spring means engaging the innermost portion of said pair of washers and said flange, whereby torque is transmitted from said annular disc through said spring means to said pair of washers and from said pair of washers through said second set of spring means to said radial flange.

7. A vibration damper assembly comprising a hub having an integral annular flange, a first annular member carried on said hub for relative rotatable movement therewith, means defining a plurality of apertures in said annular flange and in said first annular member co-aligned with respect to each other forming a first set of apertures, spring means positioned within said first set of apertures adapted to transmit torque from said first annular member to said flange, means to control frictional damping between said annular flange and said first annular member, a second annular member adapted to be engaged by a driving member, a plurality of apertures formed in said second annular member and in said first annular member co-aligned with respect to each other forming a second set of apertures, and additional spring means positioned within said second set of apertures adapted to transmit torque from said second annular member to said first annular member.

References Cited in the file of this patent

UNITED STATES PATENTS

| | | |
|---|---|---|
| 2,065,601 | Meyer | Dec. 29, 1936 |
| 2,636,363 | Nutt | Apr. 28, 1953 |
| 2,920,733 | Lysett | Jan. 12, 1960 |
| 3,023,593 | Nallinger | Mar. 6, 1962 |